Oct. 31, 1944.   C. T. GRIFFITH ET AL   2,361,838
HOSIERY DRIER
Filed Feb. 25, 1943   6 Sheets-Sheet 1
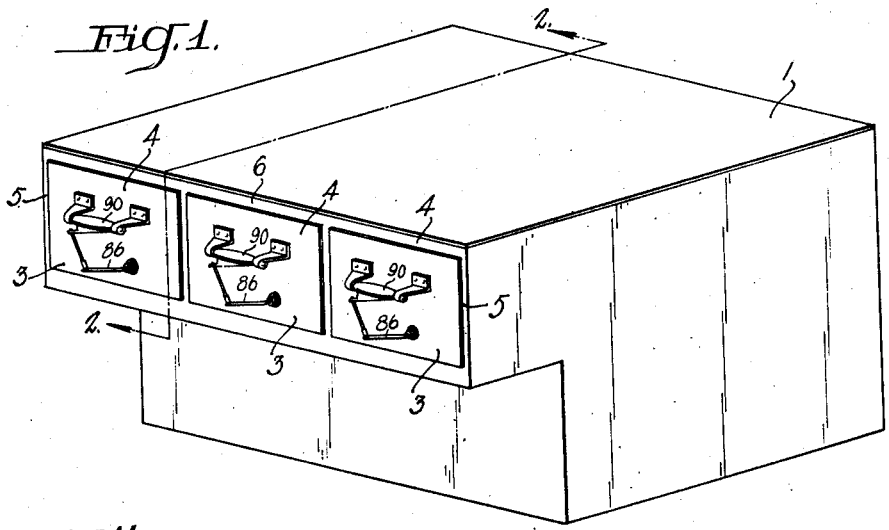
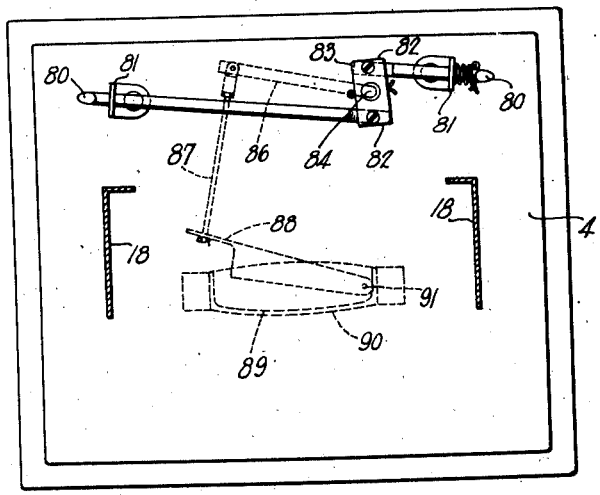
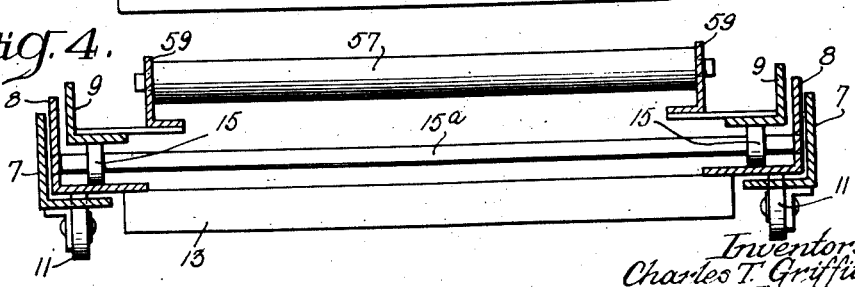

Oct. 31, 1944. C. T. GRIFFITH ET AL 2,361,838
HOSIERY DRIER
Filed Feb. 25, 1943 6 Sheets-Sheet 2
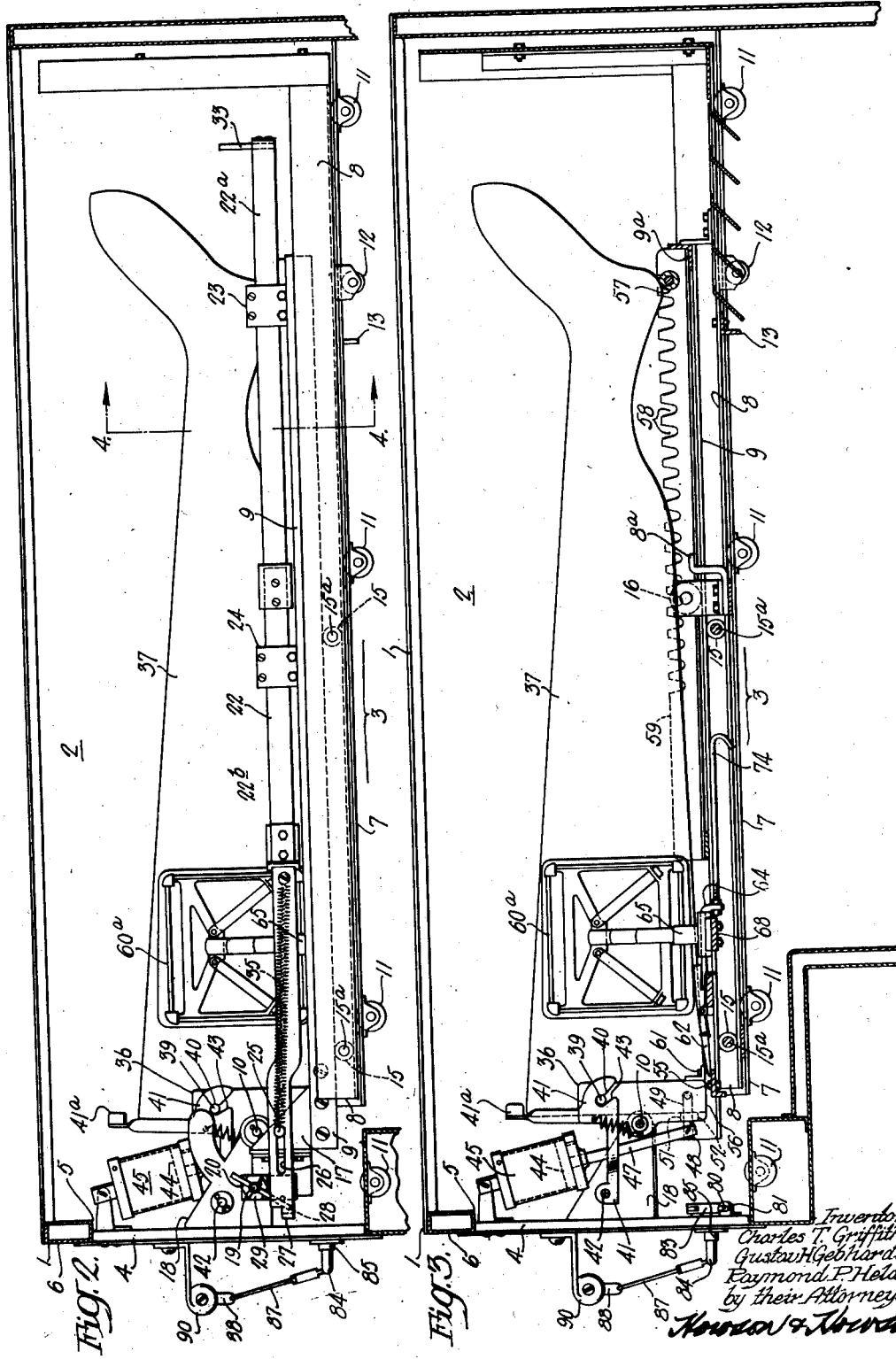
Inventors:-
Charles T. Griffith
Gustav H. Gebhardt
Raymond P. Helder
by their Attorneys Oct. 31, 1944. C. T. GRIFFITH ET AL 2,361,838
HOSIERY DRIER
Filed Feb. 25, 1943 6 Sheets-Sheet 3
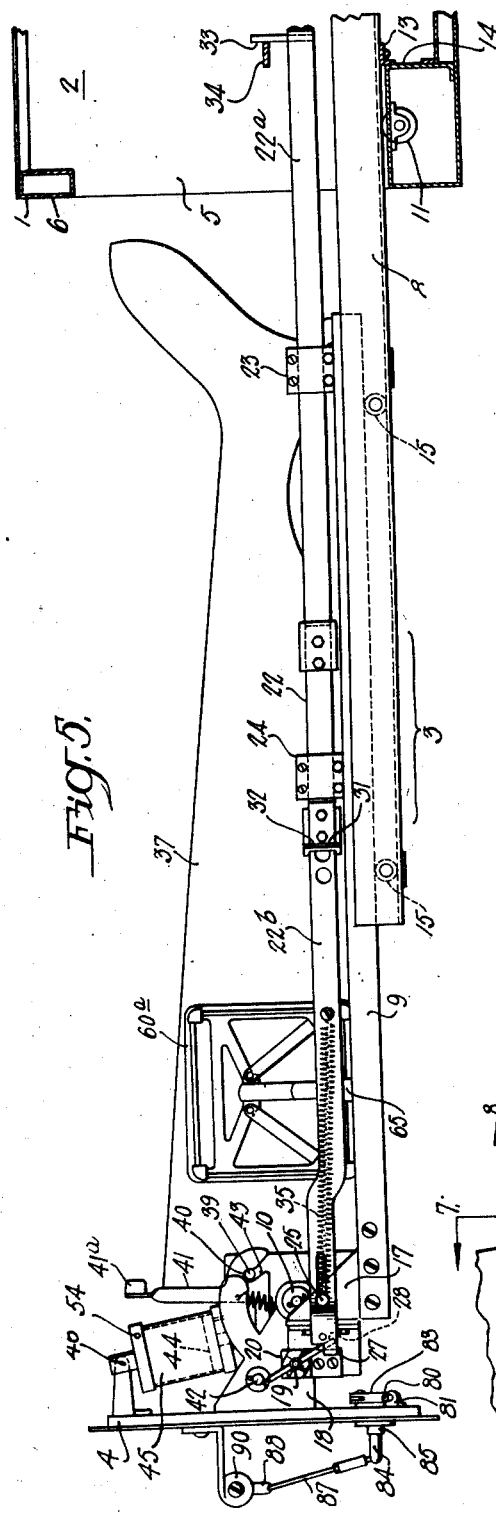
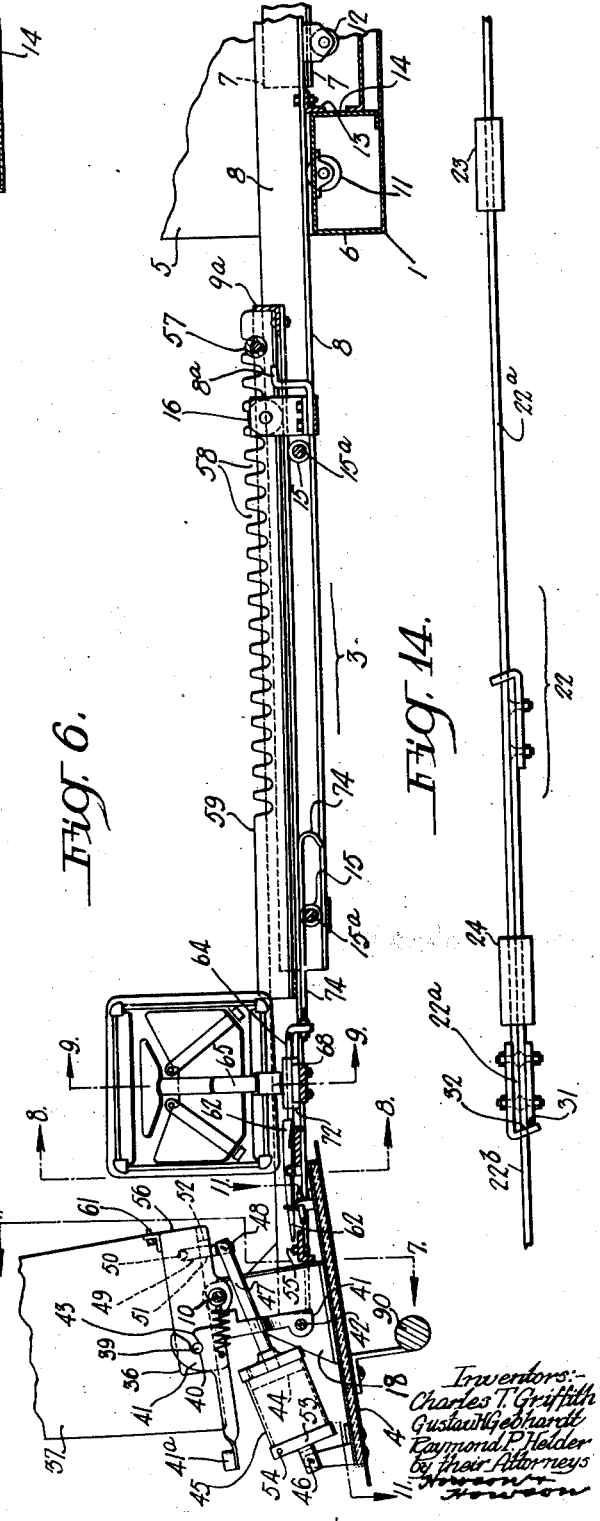

Oct. 31, 1944.   C. T. GRIFFITH ET AL   2,361,838
HOSIERY DRIER
Filed Feb. 25, 1943   6 Sheets-Sheet 5
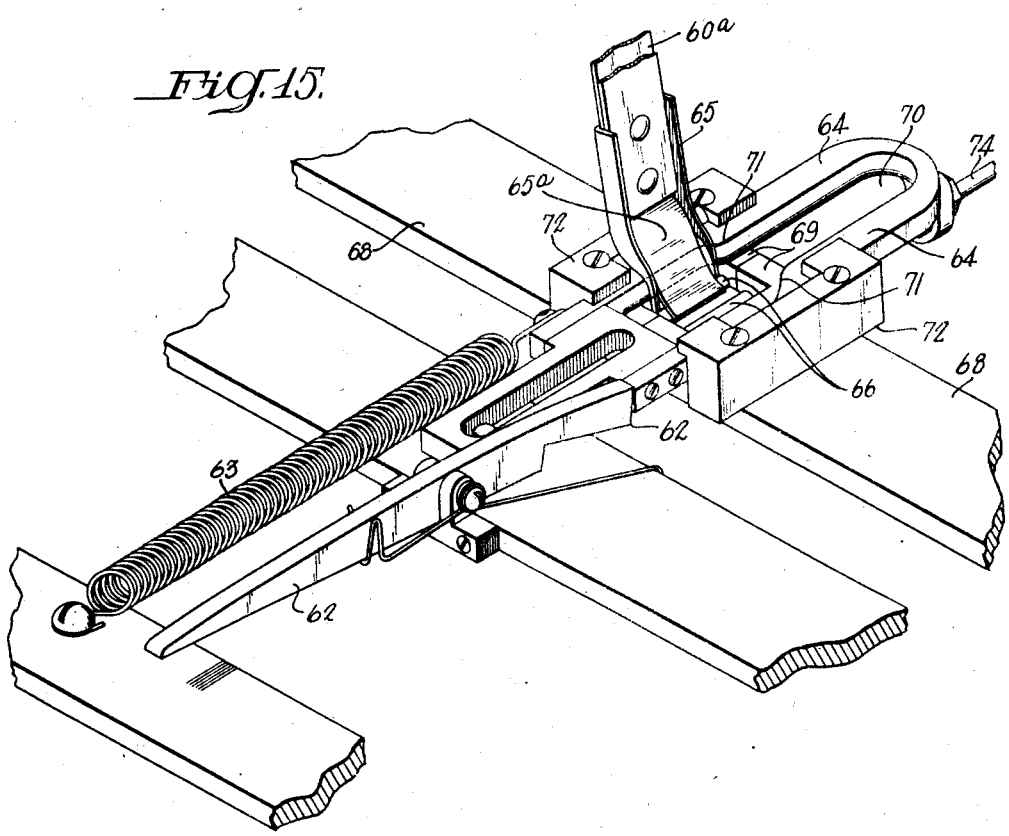
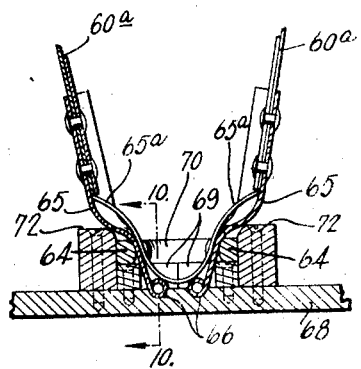
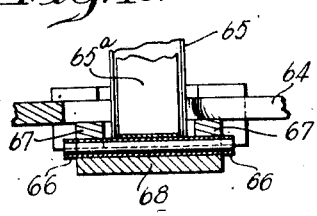
Inventors:—
Charles T. Griffith
Gustav H. Gebhardt
Raymond P. Helder
by their Attorneys
Howsen & Howsen

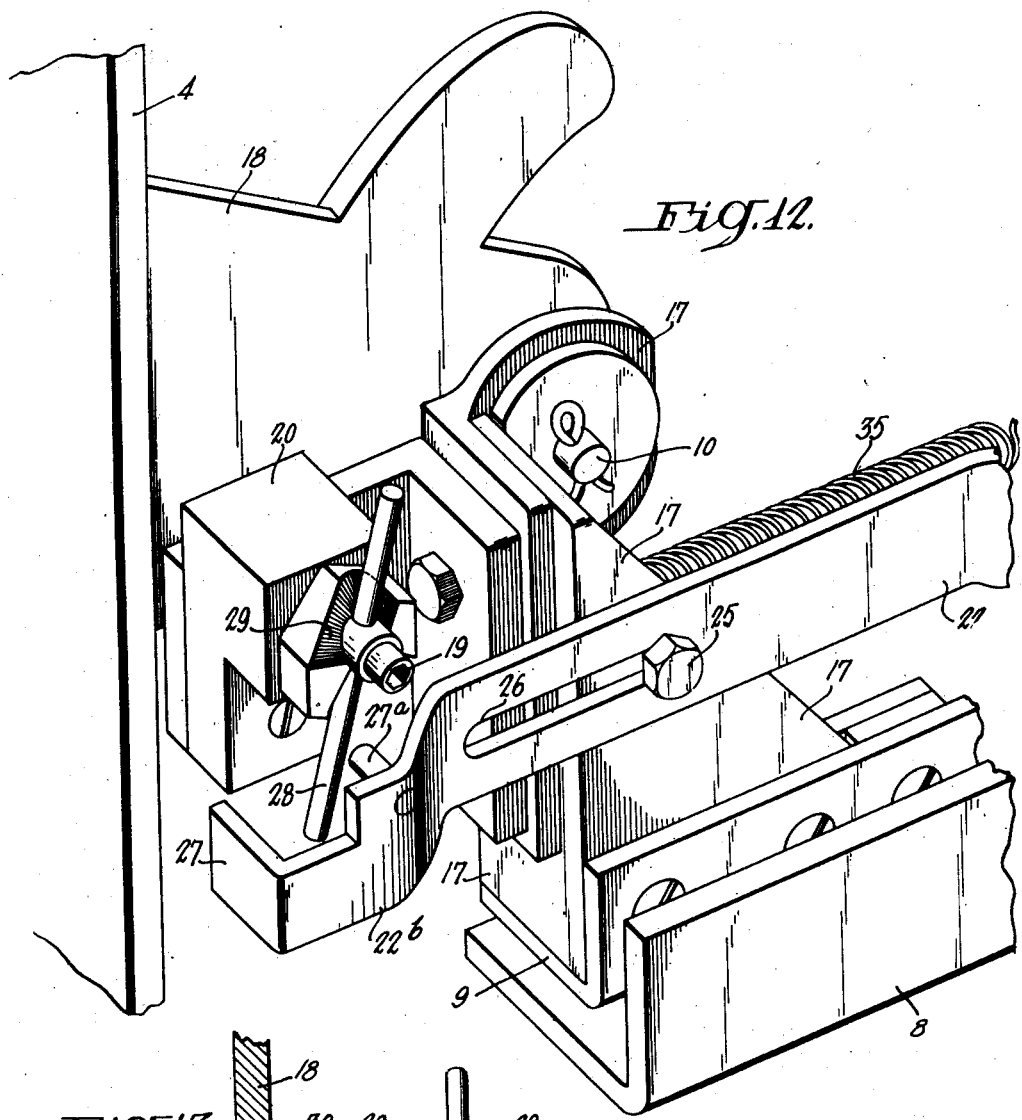
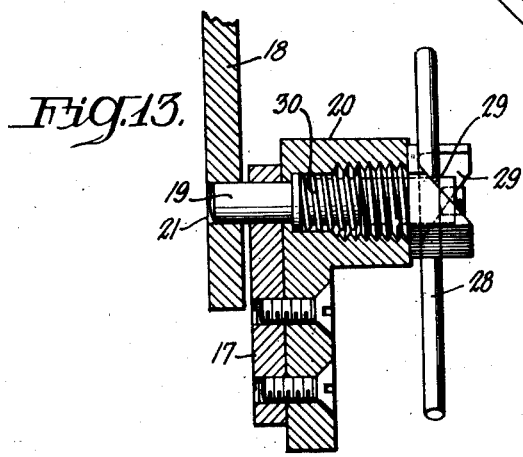

Patented Oct. 31, 1944

2,361,838

UNITED STATES PATENT OFFICE 2,361,838

HOSIERY DRIER

Charles T. Griffith and Gustav H. Gebhardt, Philadelphia, Pa., and Raymond P. Helder, Pleasantville, N. J., assignors to Proctor and Schwartz, Incorporated, Philadelphia, Pa., a corporation of Pennsylvania Application February 25, 1943, Serial No. 477,152

17 Claims. (Cl. 223—76)

This invention relates to devices for treating hosiery on forms, i. e. for drying hosiery, in general, as a final step in the finishing process, or for preboarding, as a prerequisite to the final finishing of nylon stockings, and the like.

The present invention more particularly relates to a hosiery treating device of the low cabinet or table-and-drawer type, such as that disclosed in the present assignee's prior United States Letters Patent No. 1,552,312, issued September 1st, 1925, to Frederick Kershaw and Alpheus O. Hurxthal.

More specifically, the present invention relates to mechanism for operating and controlling a series of hosiery forms in each of the drawers of the cabinet, whereby, as each drawer is withdrawn to a predetermined open position relative to the cabinet, the forms therein may be raised en masse from a horizontal position, occupied during the treating of the hosiery on the forms, to a vertical position, for stripping and reloading by the operator.

In the general manner of the aforesaid prior patent, the front of each drawer is adapted to be swung from a vertical plane, which it normally occupies when the drawer is closed, to a substantially horizontal plane, which the front of the drawer assumes when the drawer is open. In the present instance, the swinging movement of the front of the drawer to the aforesaid horizontal position is utilized to effect the aforesaid change of position of the forms with respect to the drawer.

Another feature of the invention resides in the provision of independent controlling mechanism for each form in each drawer, for independently lowering the form, automatically, from its vertical to its horizontal position.

Another feature of the invention resides in the provision of a novel form of clamp for holding the open top end of a stocking against creeping along the leg of the stocking form while the stocking is drying thereon.

Another feature resides in the clamp for each form being automatically closed when the form, with a newly boarded stocking thereon, in descending from its vertical loading position to its horizontal drying position, fully attains this latter position.

Another feature resides in the provision of mechanism by which the clamps of all of the forms in a single drawer are automatically opened when the drawer is opened to its fullest extent, prior to the swinging of the front of the drawer from its normal vertical position to its horizontal position to raise the forms from their horizontal drying positions to their vertical stripping and loading positions.

Another feature resides in the provision of means for releasing the clamp-opening means, after the drawer is fully opened, whereby the clamps may be independently closed, automatically, as each reloaded form is lowered into its horizontal position.

Other individual features will become apparent with a full understanding of the operation of the mechanism of the present invention, as disclosed in the following description, and upon reference to the accompanying drawings, of which:

Fig. 1 is a perspective view of the cabinet fully closed;

Fig. 2 is a vertical sectional elevation taken on the line 2—2, Fig. 1, at one side of the drawer, with the drawer in its fully closed position;

Fig. 3 is a vertical section similar to Fig. 2 with the section taken substantially in the plane of one of the stockings confined within the drawer, as for example on the line 3—3, Fig. 7;

Fig. 4 is a transverse sectional elevation taken on the line 4—4, Fig. 2;

Fig. 5 is a view similar to Fig. 2, with the drawer fully opened;

Fig. 6 is a view similar to Fig. 3 with the drawer open and the stocking forms in vertical stripping and loading position;

Fig. 9 is a transverse sectional elevation taken on the line 9—9, Fig. 6;

Fig. 10 is a sectional elevation taken on the line 10—10, Fig. 9;

Fig. 11 is a sectional plan view taken on the line 11—11, Fig. 6;

Fig. 12 is a fragmentary perspective view of the locking mechanism for the front of the drawer;

Fig. 13 is a sectional elevation of the lock shown in Fig. 12;

Fig. 14 is a fragmentary plan view of the controlling bar for the drawer lock shown in Figs. 12 and 13; and Fig. 15 is a fragmentary perspective view of the stocking clamp operating mechanism.

Figure 7:
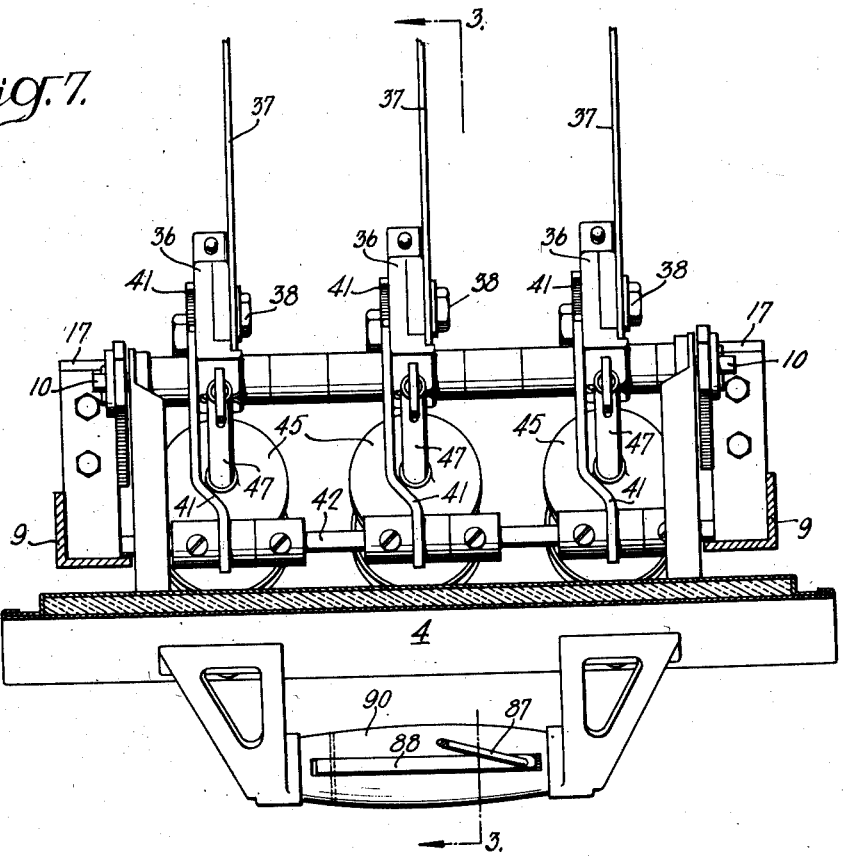
Fig. 7 is a transverse sectional elevation taken on the line 7—7, Fig. 6.

Insofar as the present invention is concerned, the cabinet 1 may be of any suitable construction to provide drawer space 2 for the reception of one or more drawer units 3, each of which is provided with a front panel 4 for closing an opening 5 in the front wall 6 of the cabinet, in which, and the associated drawer space 2, the drawer unit 3 is adapted to slide horizontally.

As shown in the drawings, the lower part of the drawer space 2 is provided with laterally spaced fixed rails 7, 7 on which the drawer unit 3 is adapted to slide.

The drawer unit 3 comprises a primary frame 8 and a secondary frame 9, forming a telescoping structure, with the door or front panel 4 pivoted to the forward end of the secondary frame 9 at a point 10 spaced vertically above the plane of the telescoping frame 8—9, and above or inwardly from the lower or back edge of the front panel 4 of the drawer.

The stationary rails 7, 7 are provided with antifriction rollers 11 on which the primary frame 8 rolls; and the primary frame 8 is provided with anti-tilting rollers 12 which bear against the undersides of the fixed rails 7, 7 to prevent the drawer from tilting when open.

The primary frame 8 is also provided with a stop 13 which is adapted to engage the rear face 14 of the framework of opening 5 in the front wall 6 of the cabinet, to prevent the drawer from being accidentally withdrawn, completely, from the cabinet 1.

The primary frame 8 is provided with cross shafts or rods 15a supporting antifriction rollers 15 on which the secondary frame 9 rides during relative movement between the two frames of the telescoping structure, when the drawer is being opend and closed; and the primary frame 8 is provided with anti-tilting rollers 16 which prevent the secondary frame 9 from tilting relative to the primary frame 8 when the telescoping structure 8—9 is fully extended, when the drawer is open.

A hooked stop 8a carried by the primary frame 8 and engageable with a rear cross bar 9a of the secondary frame 9 prevents relative separation of the two frames when the telescoping structure 8—9 is fully extended.

The rod 10, on which the front panel 4 is pivoted, is carried by a pair of brackets 17, 17 which are secured to the front end of the secondary frame 9, and this rod supports a pair of brackets 18, 18 which are secured to the front panel 4 and provide the pivotal support therefor.

The front panel 4 is normally held in its vertical position by a locking bolt or pin 19, which is slidably mounted in a bearing 20 secured to the bracket 17 on one side of the secondary frame 9, and projects into a keeper opening 21 formed in the adjacently disposed panel bracket 18, as shown in detail in Fig. 13.

The locking pin 19 is adapted to be automatically withdrawn from the keeper 21, when the drawer 3 is pulled out to its maximum extent, by a telescoping release rod 22 which has one section 22a slidably mounted in bearings 23 and 24 secured to the secondary frame 9, and a section 22b slidably mounted in the bearing 24 and on a stud 25 projecting from one of the brackets 17, through an elongated slot 26 formed in the section 22b.

The forward end of the rod section 22b is provided with a hook 27 which engages an arm 28 on the outer end of the locking pin 19 and rotates said pin in its bearing 20, during the last of the movement of the drawer 3 to its extreme open position.

The arm 28, in rotating about the axis of the locking pin 19 engages a cam 29 formed on the outside of the bearing 20, which pulls the pin 19 out of the keeper opening 21 against the action of a spring 30 housed in the barrel of the bearing 20.

To effect the necessary pull on the rod section 22b to effect rotation of the arm 28, the rear end of the section 22b is provided with a shoulder 31 which engages a shoulder 32 on the forward end of the section 22a, and the rear end of the section 22a is provided with a shoulder 33 which engages a fixed stop 34 on the framework of the drier within the drawer space 2 in which the drawer 3 slides.

When the drawer 3 is released, after being pulled out to its fullest extent, and the front panel 4 is moved from its vertical to its horizontal position, a spring 35 retracts the secondary frame 9 relative to the primary frame 8, while the telescoping rod 22 remains in its fully extended position; and a lug 27a on the rod section 22b, spaced rearwardly from the hook 27, engages the arm 28 and turns the pin 19 to its original position ready to enter the keeper opening 21 when the front panel 4 is reestablished in its vertical position, for locking the front panel in said vertical position.

The pivot rod 10, which pivotally connects the front panel 4 to the secondary frame 9, also pivotally supports a series of form carriers 36, 36, to which a series of forms 37, 37 are respectively secured by bolts 38, 38.

Each of the carriers 36 is provided with a locking stud 39 which normally is disposed in a slot 40 formed in a locking and tripping latch 41 pivotally mounted at 42 on the front panel 4, which normally maintains the form 37 in a position substantially perpendicular to the plane of the front panel 4, whether the front panel is in its vertical or its horizontal position.

As the drawer 3 is opened to its fullest extent and the front panel 4 is unlocked and swung from its vertical position to its horizontal position, the latches 41, 41 cause the forms 37, 37 to move from their normal horizontal positions in the drawer, as shown in Figs. 2, 3 and 5, to vertical stripping and reloading positions, as shown in Fig. 6.

As each form 37 is stripped of a treated stocking and a non-treated stocking is placed on the form, the operator presses on the finger pad 41a of the latch 41 associated with that particular form. This causes a cam surface 43 in the slot 40 of the latch 41 to engage the stud 39 and tip the form until its center of gravity passes to one side of the axis of the pivot rod 10, whereupon the weight of the overbalanced form 37 will cause it to drop by gravity, about the pivot rod 10, into its horizontal position.

Free falling of the toppling form is checked and the form lowered gently by a piston 44 operating in a cylinder 45 having one end pivotally connected to the front panel 4, at 46. The piston 44 is attached to the inner end of a rod 47, the opposite end of which is pivotally connected at 48 to one end of a link 49, the opposite end of which is pivotally connected at 50 to the form carrier 36 at one side of the pivot rod 10.

The link 49 operates between fixed abutments 51 and 52 on the carrier 36, to provide a certain amount of lost motion between the link and the carrier, to avoid the necessity for manually tipping the form 37 against the air trapped in the cylinder 45 between the head 53 thereof and the piston 44. An opening 54 in the wall of the cylinder permits this trapped air to bleed out gradually as the form moves from its vertical to its horizontal position, with the cylinder functioning as a dash pot to check the initial rapid downward movement of the form.

The form is stopped in its final horizontal position, by the leading edge 56 of the carrier 36 coming into contact with an adjustable abutment 55 carried by the secondary frame 9, as shown in Fig. 3, at the same time, if desired, as the heel of the form 37, with a stocking thereon, comes to rest against a transverse padded bar 57 which has its opposite ends respectively mounted in notches 58 formed in racks 59 carried by the secondary frame 9. The bar 57 is adjustable along the length of the racks 59 for accommodating forms for different sizes of women's or children's stocking, or men's socks.

Figure 8:
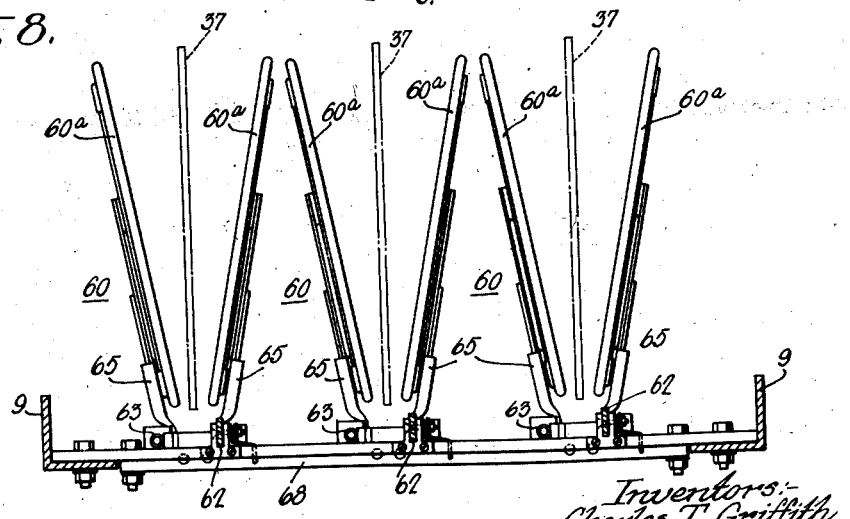
Fig. 8 is a transverse sectional elevation taken on the line 8—8, Fig. 6.

As each form approaches its final horizontal position it passes between divergent jaws 60a, 60a (Fig. 8) of a hold-down clamp 60. As the form 37 finally comes to rest in its horizontal position an adjustable lug 61 (Fig. 6) on the carrier 36 automatically trips a catch 62 (Fig. 15) which holds the jaws 60a, 60a in their open position, whereupon a spring 63 operating a sliding box cam 64 closes the jaws 60a, 60a and holds them firmly against the opposite faces of the form 37, with the fabric of the stocking adjacent the open end thereof firmly gripped between said jaws and said form.

As shown in Figs. 9 and 10, the jaws 60a, 60a, are each provided with an arm 65 having lateral trunnions 66 mounted in bearings 67, 67 formed partly by a cross bar 68 of the secondary frame 9, and partly by blocks 69, 69 secured to said bar.

The arms 65, 65 project upwardly through the open center 70 of the box cam 64. The box cam 64 is provided with convergent edges 71, 71 which, as the cam moves relative to the clamps, bear against the outsides of the arms 65, 65 of the jaws 60a, 60a, above their trunnions 66, 66, and close and lock the jaws firmly against the form 37.

The box cam 64 is slidably mounted for movement in the direction of the length of the telescoping structure 8—9 in a guide block 72 secured to the bar 68 of the frame 9. The spring 63, having one end secured to the cam 64 and its opposite end secured to the frame 9, moves the cam 64 in its jaw-closing direction when the catch 62 is tripped by the descending form, and releases the cam 64.

The cam 64 is moved in its opposite direction, to release the jaws 60a, 60a, by a hook 74 which engages one of the roller rods 15a of the anti-friction rollers 15 on the frame 9, and which extends transversely of and is secured at its opposite ends respectively to the frame 9. As the drawer 3 is moved to its extreme open position, the hooks 74 slide the cams 64 longitudinally, causing the jaws 60a, 60a associated with each form 37 in the drawer to be opened, and the catches 62, 62 to be reset, whereby the forms 37, 37 may be raised to their vertical positions by the latches 41, 41, in the swinging of the front panel 4 from its vertical to its horizontal position, as previously described.

The actual opening of the jaws 60a, 60a, is effected by bow springs 65a, 65a positioned between the clamp arms 65, 65, as shown in Fig. 9.

When the drawer 3 is released, after opening, the spring 35 retracts the drawer slightly, to release the hooks 74, 74 from the rod 15a, to permit the cams 64 to be independently operated by their springs 63, 63 as each form 37 moves separately from its vertical stripping position to its horizontal position, as previously noted.

The front panel 4 is locked in its horizontal position by a pair of bolts 80, 80 (Fig. 11) which are slidably mounted in bearings 81, 81 secured to the inside of the panel 4. The outer ends of the bolts 80, 80 are adapted to engage the opposite side bars of the secondary frame 9. The inner ends of the bolts 80, 80 are connected at 82, 82, to the opposite ends of a lever 83.

The lever 83 is fixed to the inner end of a shaft 84 which is rotatably mounted in a bearing 85 secured to the front panel 4. On the outer end of the shaft 84 is an arm 86 to which is pivotally connected one end of a link 87. The opposite end of the link 87 is pivotally connected to one end of a lever 88.

The lever 88 is mounted in a slot 89 formed in the handle 90 of the door, with the lever 88 pivoted at 91 adjacent one end of the handle.

As the operator grasps the handle 90, to swing the front panel 4 from its horizontal to its vertical position, he inherently squeezes the lever 88 in his grasp and rocks the lever 88 about its pivot. Rocking of the lever 88 releases the bolts 80, 80 from the frame 9, thus permitting the panel 4 to be rocked about the axis of the pivot rod 10 from its horizontal to its vertical position, and as the panel assumes its vertical position the locking pin 19 enters the keeper opening 21 and holds the panel 4 in its vertical position.

After all the forms 37, 37 in the drawer have been lowered to their horizontal positions, while the front panel 4 remains in its horizontal position, and the panel 4 is then moved to its vertical position, the latches 41, 41 which were completely disconnected from the studs 39, 39 on the carriers 36, in order to permit the forms 37 to fall, become reengaged with the studs 39, 39, so that the forms 37 will again be raised when the front panel 4 is subsequently moved from its vertical to its horizontal position.

We claim:

1. The combination of a stocking form, a pivot for said form, means for holding said form in a vertical position, means for tilting said form to fall by gravity to a horizontal position about said pivot, means for controlling the speed of travel of said form during said falling thereof, and means affording predetermined lost motion between said form and said speed controlling means during initial tilting of the form.

2. The combination of a stocking form, a pivot for said form, releasable means for holding said form in a vertical position, said form being adapted to fall by gravity to a horizontal position about said pivot, and means for controlling the speed of travel of said form during said falling thereof comprising a piston and rod operating in a fluid-trapping cylinder, a link pivotally connected to said rod and said form, and a pair of abutments in fixed relation to said form at opposite sides respectively of said link for engagement with said link to afford lost motion between said fall-controlling means and said form during initial movement of the form from said vertical position.

3. The combination of a pivoted stocking form, a pivoted base, parallel pivots for said form and base respectively, means for holding said form in predetermined relation to said base, means for holding said base in a predetermined position with said form extending vertically, and means for tipping said form to fall by gravity into a horizontal position.

4. The combination of a stocking form, a pivot for said form, a pivoted base, means pivoted to said base in spaced relation to the pivot of said form for holding said form in predetermined relation to said base, means for holding said base in a predetermined position with said form extending vertically, and means for tipping said form to fall by gravity into a horizontal position.

5. The combination of a pivoted stocking form, a pivoted base, means for holding said form in predetermined relation to said base, means for holding said base in a predetermined position with said form extending vertically, and means forming part of said holding means for tipping said form to fall by gravity into a horizontal position.

6. The combination of a stocking form, a base, a common pivot for said form and said base, a latch pivoted to said base in spaced relation to said common pivot for holding said form in predetermined relation to said base as said base is swung about said common pivot from one to another of two different positions.

7. The combination of a stocking form, a base, a common pivot for said form and said base, a latch pivoted to said base and engageable with said form in spaced relation to said common pivot for holding said form in predetermined relation to said base during pivotal movement of said base adapted to bring said form into a vertical position, and means forming part of said latch for tipping said form to fall by gravity into a horizontal position.

8. The combination of a stocking form, a base, a common pivot for said form and said base, a latch pivoted to said base in spaced relation to said common pivot for holding said form in predetermined relation to said base during pivotal movement of said base and said form about said common pivot to bring said form into a vertical position, means for tipping said form to fall by gravity into a horizontal position, and means for controlling the speed of descent of said form.

9. The combination of a horizontally slidable frame, a front panel pivoted to and normally disposed substantially at right angles to said frame, a stocking form pivotally mounted on said frame, means for holding said form in substantially perpendicular relation to said panel, and means for swinging said panel from said right angle position to a position substantially parallel to said frame.

10. The combination of a horizontally slidable frame, a front panel pivoted to and normally disposed substantially at right angles to said frame, a stocking form pivotally mounted on said frame, means for holding said form in substantially perpendicular relation to said panel, means for swinging said panel from said right angle position to a position substantially parallel to said frame to position said form in substantially vertical relation to said frame and means for tilting said form to fall by gravity to a substantially horizontal position on said frame.

11. The combination of a horizontally slidable frame, a front panel pivoted to and normally disposed substantially at right angles to said frame, means for locking said panel in said position relative to said frame, a stocking form connected to said panel, means responsive to horizontal movement of said frame in one direction for releasing said panel-locking means, and means for swinging said panel and form about the pivot of said panel to change the position of said form from a substantially horizontal position to a substantially vertical position relative to said frame.

12. The combination of a horizontally slidable frame, a front panel pivoted to and normally disposed substantially at right angles to said frame, means for locking said panel in said position relative to said frame, a stocking form connected to said panel, means responsive to horizontal movement of said frame in one direction for releasing said panel-locking means, means for swinging said panel about its pivot into a substantially horizontal position with said form in a substantially vertical position, and means for locking said panel in said horizontal position.

13. The combination of a horizontally slidable frame, a front panel pivoted to and normally disposed substantially at right angles to said frame, a stocking form pivotally mounted on said frame, means for holding said form in substantially perpendicular relation to said panel, means for swinging said panel on its pivot into a substantially horizontal position with said form in a substantially vertical position, means for locking said panel in said horizontal position, and means for tilting said form to fall by gravity into a substantially horizontal position.

14. The combination of a horizontally slidable frame, a front panel pivoted to and normally disposed substantially at right angles to said frame, a stocking form pivotally mounted on said frame, means for holding said form in substantially perpendicular relation to said panel, means for swinging said panel on its pivot into a substantially horizontal position with said form in a substantially vertical position, means for locking said panel in said horizontal position, means for tilting said form to fall by gravity into a substantially horizontal position, and means forming part of the panel-swinging means for releasing said panel-locking means preparatory to returning said panel to its first said position.

15. The combination of a substantially flat form, a pivot for said form, a pair of upwardly diverging jaws spaced horizontally from said pivot, said form being movable about said pivot from a substantially vertical position to a substantially horizontal position in a plane intermediate said jaws, and means responsive to said movement of said form for closing said jaws against the opposite flat faces respectively of said form.

16. The combination of a substantially flat form, a pivot for said form, a pair of upwardly diverging jaws spaced horizontally from said pivot, said form being movable about said pivot from a substantially vertical position to a substantially horizontal position in a plane intermediate said jaws, a spring-loaded element for closing said jaws against the opposite flat faces respectively of said form, and a catch for holding said spring-loaded element inactive with said jaws in said diverging positions, said catch being operable by said form during said movement thereof for releasing said spring-loaded element to effect said closing of said jaws when said form attains said horizontal position.

17. The combination of a horizontally movable frame, a substantially flat stocking form pivotally mounted on said frame for movement from a substantially horizontal position to a substantially vertical position and vice versa, a pair of upwardly diverging jaws on said frame in horizontally spaced relation to the pivot of said form to close into flat contact with the opposite flat faces respectively of said form, a spring-loaded element for closing said jaws, a catch for holding said jaws open, and means responsive to movement of said frame in one direction for actuating said spring-loaded element to afford opening of said jaws to release said form and to set said catch, said catch being releasable by said form during its movement about its pivot from said vertical position to said horizontal position for effecting closing of said jaws by said spring-loaded element.

CHARLES T. GRIFFITH.
GUSTAV H. GEBHARDT.
RAYMOND P. HELDER.